(12) United States Patent
McManus et al.

(10) Patent No.: US 10,480,173 B2
(45) Date of Patent: Nov. 19, 2019

(54) MEMBER-TO-MEMBER LAMINAR FUSE CONNECTION

(71) Applicant: Novel Structures, LLC, Timnath, CO (US)

(72) Inventors: Patrick McManus, Timnath, CO (US); Jay Puckett, Elkhorn, NE (US); Jack Petersen, Littleton, CO (US)

(73) Assignee: Novel Structures, LLC, Timnath, CO (US)

( * ) Notice: Subject to any disclaimer, the term of this patent is extended or adjusted under 35 U.S.C. 154(b) by 0 days.

(21) Appl. No.: 15/950,369

(22) Filed: Apr. 11, 2018

(65) Prior Publication Data

US 2019/0316342 A1 Oct. 17, 2019

Related U.S. Application Data

(60) Provisional application No. 62/485,201, filed on Apr. 13, 2017.

(51) Int. Cl.
| | |
|---|---|
| *E04B 1/24* | (2006.01) |
| *E04H 9/02* | (2006.01) |
| *E04C 3/30* | (2006.01) |
| *E04C 3/04* | (2006.01) |

(52) U.S. Cl.
CPC .............. *E04B 1/2403* (2013.01); *E04C 3/30* (2013.01); *E04H 9/025* (2013.01); *E04B 2001/2415* (2013.01); *E04C 2003/0465* (2013.01)

(58) Field of Classification Search
CPC ........... E04B 1/2403; E04B 2001/2415; E04H 9/025; E04C 3/30; E04C 2003/0465; H01H 85/08; H01H 85/0241

USPC .............................................. 52/167.1, 167.3
See application file for complete search history.

(56) References Cited

U.S. PATENT DOCUMENTS

| | | | |
|---|---|---|---|
| 4,074,947 A | 2/1978 | Matake | |
| 4,490,062 A | 12/1984 | Chisholm | |
| 4,905,436 A | 3/1990 | Matsuo | |
| 5,533,307 A * | 7/1996 | Tsai | ................... E04H 9/021 52/167.1 |

(Continued)

FOREIGN PATENT DOCUMENTS

WO   WO-2015192200 A1 * 12/2015 ............. E04H 9/021

*Primary Examiner* — Brent W Herring
(74) *Attorney, Agent, or Firm* — Husch Blackwell LLP

(57) ABSTRACT

A member-to-member planar connection bracket that includes multiple repeated fuse element configurations that each provide a pre-determined inelastic load-carrying capacity and a reliable inelastic deformation capacity upon development of one or more inelastic hinge locations within the fuse elements. The fuse configurations are interconnected in series such that the total deformation accommodated between first end of the bracket and second end of the bracket is the sum of deformations accommodated by the individual fuse configurations. Multiple brackets are configured in laminar configurations and interconnected to create a connection assembly that provides increased strength or increased deformation capacity as compared to an individual bracket. The connection assembly is used to connect a first structural member and second structural member. The pre-determined maximum inelastic load-carrying capacity of the assembly is less than the elastic load-carrying capacity of the first structural member and the second structural member.

17 Claims, 5 Drawing Sheets

(56) References Cited

U.S. PATENT DOCUMENTS

| | | | |
|---|---|---|---|
| 5,595,040 A | 1/1997 | Chen | |
| 5,913,794 A | 6/1999 | Chen | |
| 6,141,919 A * | 11/2000 | Robinson | F16F 1/40 248/562 |
| 6,457,284 B1 * | 10/2002 | Isoda | E04H 9/02 52/167.1 |
| 6,474,902 B1 | 11/2002 | Beauvoir | |
| 6,631,592 B1 * | 10/2003 | Hancock | E04C 5/165 403/305 |
| 6,739,099 B2 | 5/2004 | Takeuchi | |
| 6,799,400 B2 * | 10/2004 | Chuang | F16F 7/12 188/371 |
| 7,497,054 B2 | 3/2009 | Takeuchi | |
| 7,987,639 B2 * | 8/2011 | Christopoulos | E04H 9/022 52/167.3 |
| 8,590,220 B2 * | 11/2013 | Ozaki | E04H 9/02 52/167.1 |
| 8,683,758 B2 * | 4/2014 | Christopoulos | E04H 9/02 248/560 |
| 8,875,452 B2 * | 11/2014 | Kawai | E04H 9/021 52/167.1 |
| 8,881,491 B2 * | 11/2014 | Christopoulos | E04H 9/022 52/167.1 |
| 9,309,672 B2 * | 4/2016 | Tsai | E04C 3/00 |
| 9,322,170 B2 * | 4/2016 | Tsai | E04C 3/04 |
| 9,514,907 B2 * | 12/2016 | McManus | H01H 85/0017 |
| 9,915,078 B2 * | 3/2018 | Gray | E04H 9/021 |
| 2002/0100229 A1 | 8/2002 | Chen | |
| 2002/0184836 A1 * | 12/2002 | Takeuchi | E04B 1/2403 52/167.1 |
| 2004/0074161 A1 * | 4/2004 | Kasai | E04H 9/02 52/167.1 |
| 2004/0244330 A1 | 12/2004 | Takeuchi | |
| 2006/0144006 A1 * | 7/2006 | Suzuki | E04B 1/2403 52/655.1 |
| 2010/0205876 A1 * | 8/2010 | Christopoulos | E04H 9/02 52/167.3 |
| 2013/0001383 A1 | 1/2013 | Jay | |
| 2013/0074427 A1 * | 3/2013 | Kawai | E04H 9/021 52/167.4 |
| 2013/0283709 A1 * | 10/2013 | Christopoulos | E04H 9/022 52/167.1 |
| 2014/0062648 A1 * | 3/2014 | McManus | H01H 85/0017 337/188 |
| 2015/0128506 A1 * | 5/2015 | Newman | E04H 9/027 52/99 |
| 2015/0159362 A1 | 6/2015 | Pryor | |
| 2017/0107734 A1 * | 4/2017 | Gray | E04H 9/021 |

* cited by examiner

MEMBER-TO-MEMBER LAMINAR FUSE CONNECTION

CROSS-REFERENCE TO RELATED APPLICATIONS

This application claims the benefit of U.S. Provisional Patent Application No. 62/485,201, filed Apr. 13, 2017, the entire disclosures of which are hereby incorporated by reference.

BACKGROUND OF THE INVENTION

Field of the Invention

The present invention relates to an assembly used to facilitate a member-to-member connection for structural load resisting systems, such as, but not limited to, seismic and progressive collapse structural load resisting systems.

Description of Related Art

Several devices, or brackets, have been developed for structural applications wherein relatively large deformations between two members are accommodated by inelastic flexural deformations (rotations) within individual elements of the connecting device. The uniqueness of these devices is that structural integrity, or load carrying capacity, between the members is maintained and predictable by use of an elastic-inelastic or elastic-plastic material, such as steel. Examples of such devices are provided in patent applications US2002/0184836 A1, PCT/US2011/042721, U.S. Pat. No. 8,683,758 B2, and U.S. Pat. No. 9,514,907 B2. In each of these cases, the strength and deformation capacity between structural members is limited by the strength and deformation capacity of the individual bracket connecting the structural members.

SUMMARY OF THE INVENTION

The present invention is directed toward a member-to-member connection assembly that includes multiple planar connection brackets, each providing a known static load capacity and a reliable inelastic deformation capacity upon development of one or more inelastic shear or flexural hinge locations, which are disposed in laminar configurations to increase the assembly strength, deformation capacity, or both. Furthermore, the assembly includes lateral restraints that prevent significant movement in all directions perpendicular to the intended direction of applied load and deformation. The individual brackets generally comprise a first connection element coupled to one side of a first fuse configuration for connection to a first structural member. The opposite end of the first fuse configuration within the bracket comprise a last connection element for connection to a second structural member or connection in series to an adjacent similar second fuse configuration, which can then be repeated in any multiple. Ultimately, the last fuse configuration in the series comprise a last fuse connection element for connection of a second structural member. The fuse elements within a fuse configuration may include one of a plurality of geometric orientations which provides specific and known hinge locations and conditions. The fuse configurations are interconnected in series such that the total deformation accommodated between the first connection element of the first fuse configuration and last connection element of the last fuse configuration is the sum of deformations accommodated by all the individual fuse configurations in the bracket. The bracket includes lateral restraints that are separate elements from the fuse element configuration or of unitary construction with the fuse element configuration.

Fuse elements are configured in part or in full to create fuse element configurations that are circular, elliptical, square, rectangular, hexagonal, octagonal, 'S' shaped, or 'Z' shaped, or shaped in other similar geometric cross sections. Multiple fuse element configurations are interconnected in series fuse connection elements such that planar connection brackets are created (see FIG. 1 through REF _Ref400638074 \h FIG. 4 for examples). Other shapes and the usage of stiffener elements in the fuse element configurations are also within the scope of the present invention. The lateral restraints in the plane of the bracket (shown above and below the bracket in REF _Ref400638063 \h FIG. 1 through REF _Ref400638074 \h FIG. 4) are comprised of elements independent of the bracket and connected to one of the first structural member and second structural member, or of unitary construction with the bracket as an extension of the bracket.

In one embodiment, multiple brackets are disposed in a laminar configuration in parallel with the first connection element of each bracket connected to the first structural member either directly or through the first connection element of adjacent brackets, and the last connection element of each bracket is connected to a second structural member either directly or through the last connection element of adjacent brackets (see FIG. 5). The strength of the assembly is the sum of the strength of the individual brackets. The deformation capacity of the assembly is the least of the individual brackets within the assembly. In use, one or more assemblies may be disposed at one or both ends of primary structural members throughout a structure that may encounter a seismic or other similar event. In the case of a building structure subjected to a seismic event, one or more fuse elements within each bracket incur inelastic deformation. The inelastic deformations of the fuse elements operate to absorb the seismic forces and displacements thereby preserving the elastic integrity of the primary structural members and connection components.

In a second embodiment, multiple brackets are disposed in a laminar configuration in series with the first connection element of the first bracket connected to the first structural member, the last connection element of the first bracket connected to the first connection element of a second bracket, and the last connection member of the second bracket connected to a second structural member or connected to the first connection element of an adjacent bracket, which can then be repeated in any multiple. Ultimately, the last connection element of the last bracket in the series is connected to a second structural member. The deformation capacity of the assembly is the sum of the deformation capacities of the individual brackets. The strength of the assembly is the least of the individual brackets within the assembly. Adjacent brackets may be disposed in the same directions (see FIG. 6) for in opposite directions (see REF _Ref479796003 \h FIG. 7).

In another embodiment, material including, but not limited to, elastomer, polymers and reinforced polymers, concrete or cementitious grout or other known materials may be placed in voids enclosed in full or in part by fuse elements or lateral restraint elements encasing the bracket to provide increased elastic stiffness, inelastic stiffness, and/or damping.

Individual fuse elements, fuse element configurations, or the connection bracket in its entirety may be formed from metal, primarily structural steel, through known fabrication processes such as cut from steel plate, casting, built up of welded shapes, machining, forming from cold bending of plates, extruding or hot rolling, forming from the laminating of components of similar or dissimilar materials, or from other fabrication or manufacturing processes. In one embodiment, the connection bracket of the present invention is of unitary construction. However, other known materials and manufacturing processes are also within the scope of the present invention.

Individual assemblies comprised of brackets disposed in a combination of series and parallel are within the scope of the present invention. Additionally, individual assemblies comprised of a combination of brackets disposed in the same direction in parallel and in opposite directions in parallel are within the scope of the present inventions.

BRIEF DESCRIPTION OF THE DRAWINGS

The accompanying drawings form a part of the specification and are to be read in conjunction therewith, in which like reference numerals are employed to indicate like or similar parts in various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit of the scope of the present invention. The present invention is defined by the appended claims and, therefore, the description is not to be taken in a limiting sense and shall not limit the scope of the equivalents to which such claims are entitled.

Figure 1:
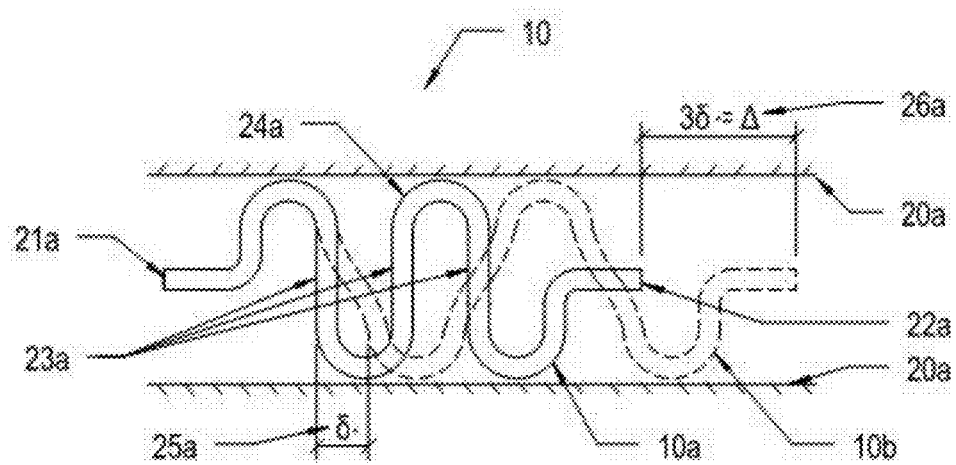
FIG. 1 is a side view of an embodiment of a member-to-member connection bracket with 'S' shaped fuse element and interconnection element configuration in accordance with the teachings of the present invention.

As illustrated in FIG. 1, a connection bracket 10 of the present invention is shown wherein connection bracket 10 includes a first connection element 21a, a second connection element 22a, and a series of fuse elements 23a interconnected by interconnection elements 24a disposed between first and second connection elements 21a and 22a. Relative deformations in the direction of the applied force are illustrated by comparison of deformed shape 10b to non-deformed shape 10a. Deformed shape 10b represents the state of bracket 10 prior to load application. Non-deformed shape 10a represents the state of the bracket 10 subsequent to application of loading that results in inelastic deformation of the fuse elements 23a. The fuse elements 23a and interconnection elements 24a are disposed such that the overall deformation (Δ) 26a of the second connection element 22a relative to the first connection element 21a is equal to the sum of the individual deformations (6) 25a of each fuse element in the direction of the applied force.

FIG. 1 shows an embodiment of a connection bracket 10 in which the fuse elements 23a and interconnection elements 24a are disposed in series in an 'S' shaped pattern, though any pattern achieving the same general effect could be used without departing from the spirit of the scope of the present invention. Furthermore, FIG. 1 shows an embodiment in which guide elements 20a may be disposed on multiple sides of the connection bracket to provide stability under compression loading and resist deformation nominally orthogonal to the direction of the applied load.

Figure 2:
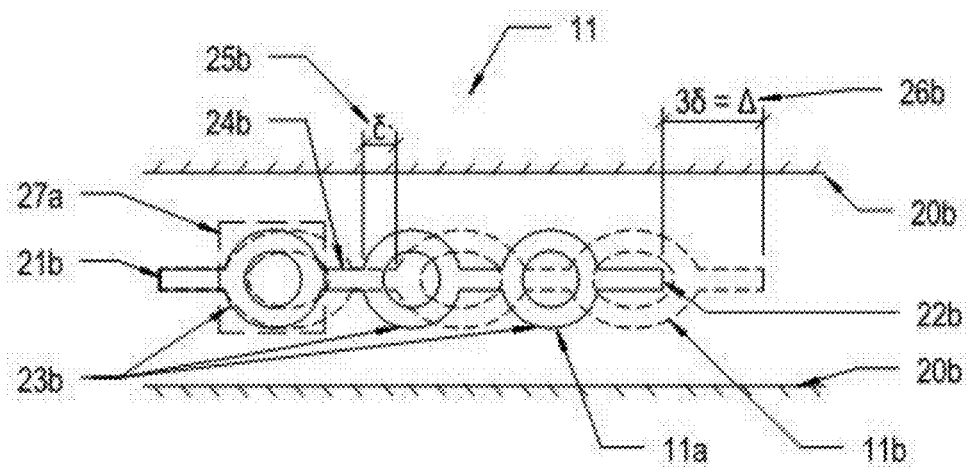
FIG. 2 is a side view of an embodiment of a member-to-member connection bracket with circular shaped fuse element configuration in accordance with the teachings of the present invention.

FIG. 2, shows one embodiment of the present invention wherein connection bracket 11 includes a first connection element 21b, a second connection element 22b, and a series of fuse elements 23b interconnected by interconnection elements 24b disposed between first and second connection elements 21b and 22b. The fuse elements 23b are configured in a circular shape to create fuse configuration 27a, though this shape could be of any cross section without departing from the spirit of the scope of the present invention. Relative deformations in the direction of the applied force are illustrated by comparison of deformed shape 11b to non-deformed shape 11a. Deformed shape 11b represents the state of bracket 11 prior to load application. Non-deformed shape 11a represents the state of the bracket 11 subsequent to application of a load that results in inelastic deformation of the fuse elements 23b. Fuse elements 23b and interconnection elements 24b are disposed such that the overall deformation (Δ) 26b of the second connection element 22b relative to the first connection element 21b is equal to the sum of the individual deformations (δ) 25*b* of each fuse element in the direction of the applied force.

FIG. 2 shows an embodiment in which guide elements 20*b* may be disposed on multiple sides of the connection bracket to provide stability under compression loading and resist deformation nominally orthogonal to the direction of the applied load.

Figure 3:
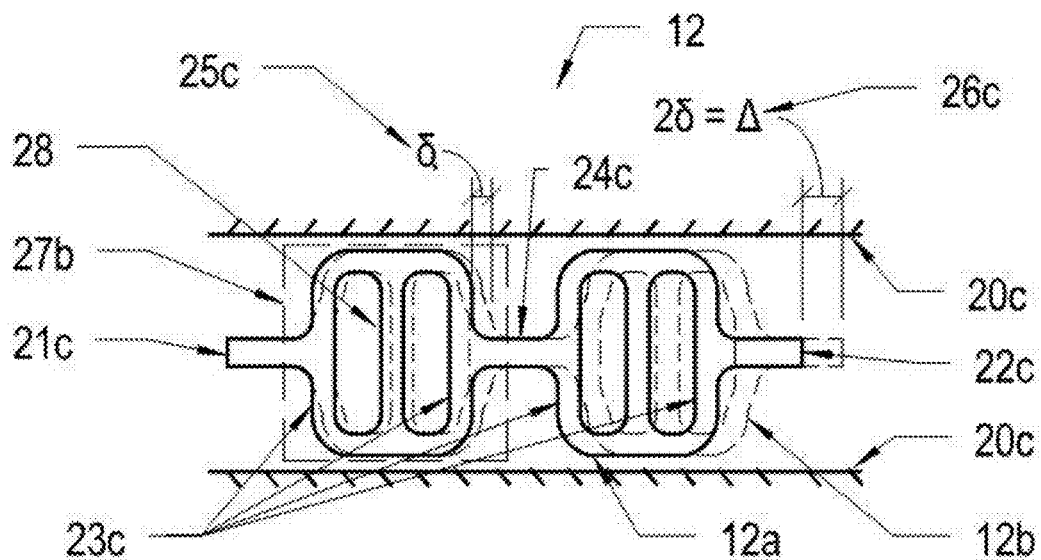
FIG. 3 is a side view of an embodiment of a member-to-member connection bracket with rectangular shaped fuse configuration with an internal stiffening element in accordance with the teachings of the present invention.

FIG. 3, shows one embodiment of the present invention wherein connection bracket 12 includes a first connection element 21*c*, a second connection element 22*c*, and a series of fuse elements 23*c* interconnected by interconnection elements 24*c* disposed between first and second connection elements 21*c* and 22*c*. The fuse elements 23*c* and interconnection elements 24*c* are configured in a rectangular shape with stiffening element 28 to create fuse configuration 27*b*, though this shape and/or stiffener configuration could be of any cross section without departing from the spirit of the scope of the present invention. Relative deformations in the direction of the applied force are illustrated by comparison of deformed shape 12*b* to non-deformed shape 12*a*. Deformed shape 12*b* represents the state of bracket 12 prior to load application. Non-deformed shape 12*a* represents the state of the bracket 12 subsequent to application of a load that results in inelastic deformation of the fuse elements 23*c*. Fuse elements 23*c* and interconnection elements 24*c* are disposed such that the overall deformation (Δ) 26*c* of the second connection element 22*c* relative to the first connection element 21*c* is equal to the sum of the individual deformations (δ) 25c of each fuse element in the direction of the applied force.

FIG. 3 shows an embodiment in which guide elements 20*c* may be disposed on multiple sides of the connection bracket to provide stability under compression loading and resist deformation nominally orthogonal to the direction of the applied load.

Figure 4:
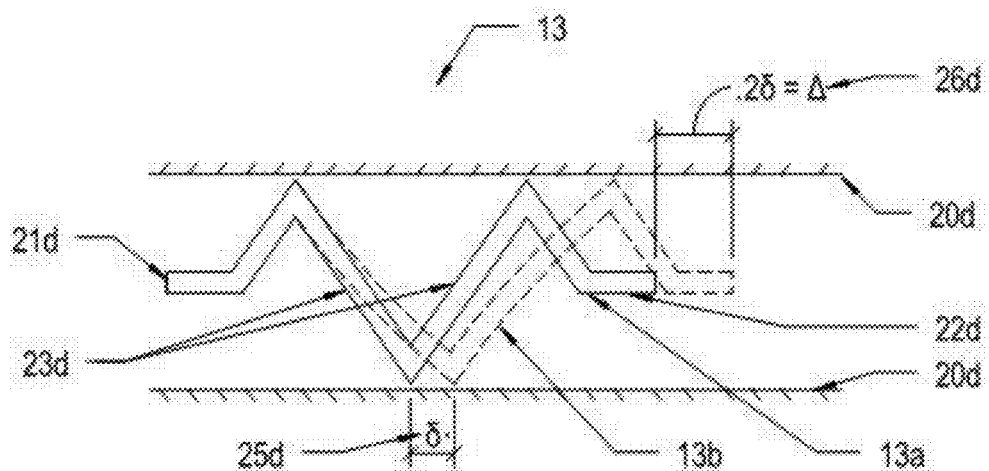
FIG. 4 is a side view of an embodiment of a member-to-member connection bracket with fuse elements disposed in a three dimensional pattern (sloped both in the plane of the page and out of the plane of the page) in a spiral configuration in accordance with the teachings of the present invention.

FIG. 4, shows one embodiment of the present invention wherein connection bracket 13 includes a first connection element 21*d*, a second connection element 22*d*, and a series of fuse elements 23*d* disposed between first and second connection elements 21*d* and 22*d*. The fuse elements 23*d* are disposed in a three-dimensional pattern (sloped both in the plane of the page and out of the plane of the page) in a spiral configuration, though the slope and articulation of fuse elements 23*d* could be varied to other patterns with departing from the spirit of the scope of the present invention. Relative deformations in the direction of the applied force or enforced displacement are illustrated by comparison of deformed shape 13*b* to non-deformed shape 13*a*. Deformed shape 13*b* represents the state of bracket 13 prior to load application. Non-deformed shape 13*a* represents the state of the bracket 13 subsequent to application of a load that results in inelastic deformation of the fuse elements 23*d*. Fuse elements 23*d* are disposed such that the overall deformation (Δ) 26*d* of the second connection element 22*d* relative to the first connection element 21*d* is equal to the sum of the individual deformations (δ) 25*d* of each fuse element in the direction of the applied force.

FIG. 4 shows an embodiment in which guide elements 20*d* may be disposed on multiple sides of the connection bracket to provide stability under compression loading and resist deformation nominally orthogonal to the direction of the applied load or enforced displacement.

Similar inelastic rotation of fuse elements of the additional embodiments of connection brackets 10, 11, 12 and 13 will perform similarly and allow the fuse elements to resist load and undergo overall inelastic deformation between the structural members connected. One substantial benefit of the present invention is that upon experience of a significant loading event such as a hurricane, earthquake, explosion, or the like, the connection bracket may experience all the inelastic behavior necessary to absorb, dissipate and respond to the loading event. As such, after such an event, in most cases the building may be reconditioned by replacing the yielded connection brackets as opposed to replacing significant primary structural members or the entire structure. This results in the potential for significant economic savings.

Any process for assembling a bracket with similar geometric characteristics may be used without departing from the spirit of the scope of the present invention. Further, while examples may have been described with respect to one or more specific types of loading such as seismic loading, the described connections and structural devises can be used for other types of loading such as but not limited to blast, wind, thermal, gravity, soil loads, including those resulting from soil displacements and the like.

Figure 5:
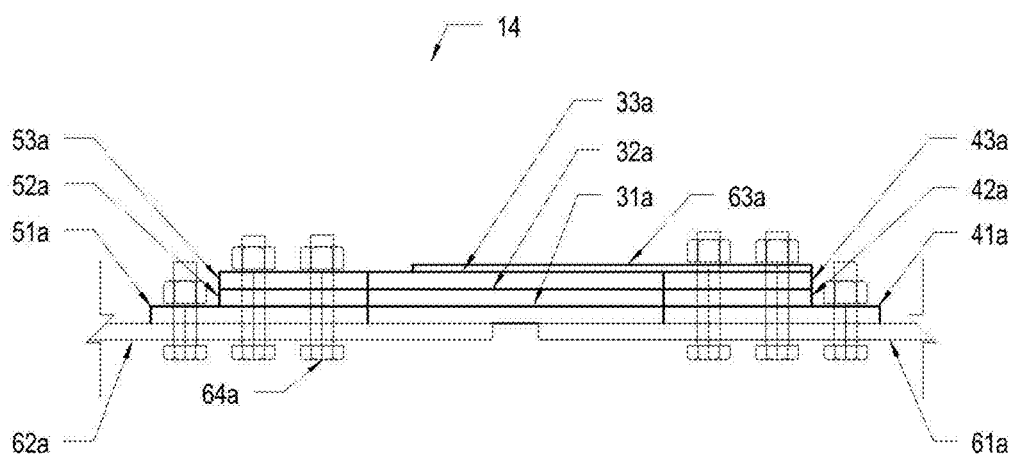
FIG. 5 is a top view of member-to-member connection assembly with the connection brackets disposed in parallel with the first end of each bracket connected to a first structural member and the last end of each bracket connected to a second structural member in accordance with the teachings of the present invention.

FIG. 5 shows one embodiment of the present invention wherein connection assembly 14 includes a first connection bracket 31*a*, a second connection bracket 32*a* and a third connection bracket 33*a* each comprised of geometry similar to one of embodiment 10, 11, 12 and 13 disposed in a parallel configuration with the first connection element 41*a*, 42*a* and 43*a* of each bracket 31*a*, 32*a* and 33*a* respectively connected to a first structural member 61*a* and the last connection element 51*a*, 52*a* and 53*a* of each bracket 31*a*, 32*a* and 33*a* respectively connected to a second structural member 62*a* in accordance with the teachings of the present invention. Structural fasteners 64*a* are conceptually shown as bolts though other types of structural fasteners could be used without departing from the scope of the present invention. A guide element 63*a* is shown as a plate though other configurations of guide elements could be used without departing from the scope of the present invention.

Figure 6:
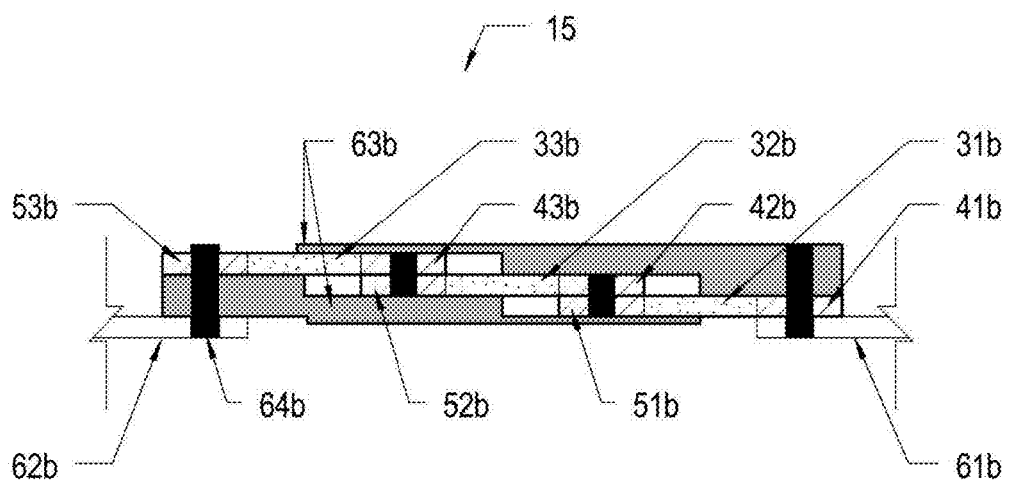
FIG. 6 is a top view of member-to-member connection assembly with the connection brackets disposed in the same direction in series with the first end of the first bracket connected to a first structural member, the last end of the first bracket connected to the first end of a second bracket, the last end of the second bracket connected to the first end of the third bracket, and the last end a third bracket connected to a second structural member in accordance with the teachings of the present invention.

FIG. 6 shows one embodiment of the present invention wherein connection assembly 15 includes a first connection bracket 31*b*, a second connection bracket 32*b* and a third connection bracket 33*b* each comprised of geometry similar to one of embodiment 10, 11, 12 and 13 disposed in a series configuration with the first connection element 41*b* of the first bracket 31*b* connected to a first structural member 61*b*, the last connection element 51*b* of the first bracket 31*b* connected to the first connection element 42*b* of the second bracket 32*b*, the last connection element 52*b* of the second bracket 32*b* connected to the first connection element 43*b* of the third bracket 33*b*, and the last connection element 53*b* a third bracket 33*b* connected to a second structural member 62*b* in accordance with the teachings of the present invention. Structural fasteners 64*b* are conceptually shown as dowel type fasteners though other types of structural fasteners could be used without departing from the scope of the present invention. A guide element 63*b* is shown as a solid stepped element though other configurations of guide elements could be used without departing from the scope of the present invention.

Figure 7:
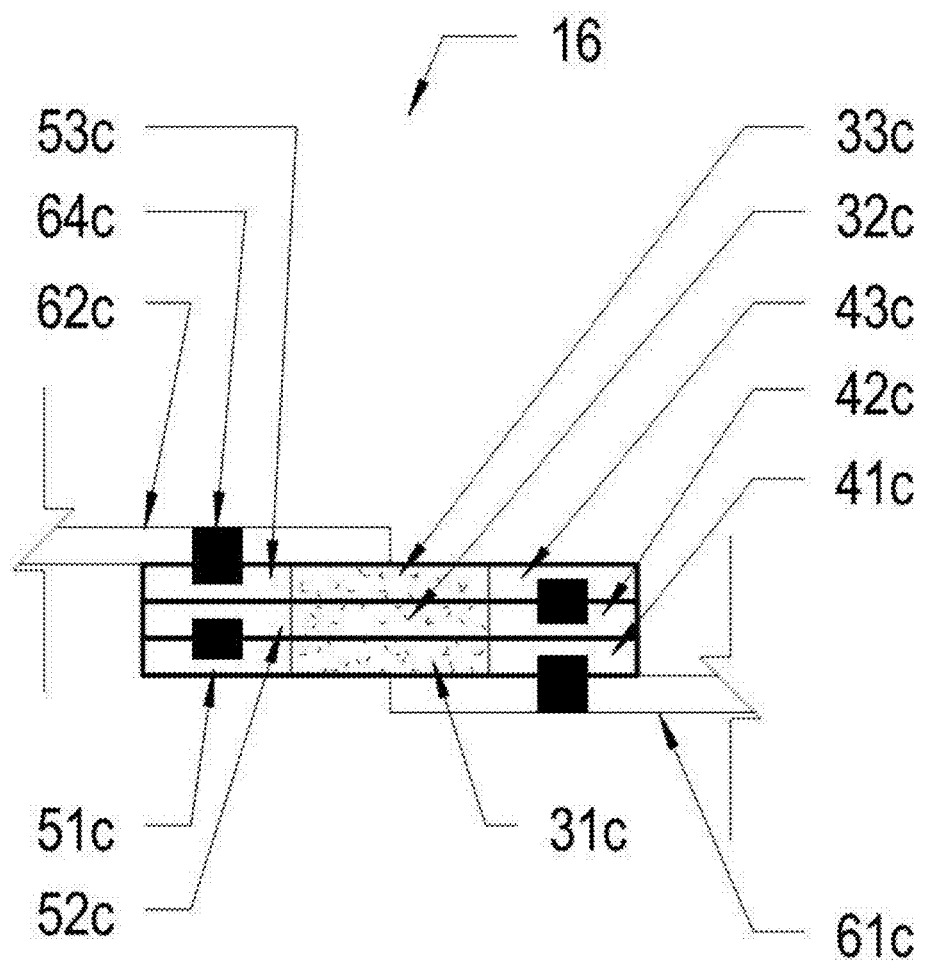
FIG. 7 is a top view of member-to-member connection assembly with the connection brackets disposed in opposite directions in series with the first end of the first bracket connected to a first structural member, the last end of the first bracket connected to the first end of a second bracket, the last end of the second bracket connected to the first end of the third bracket, and the last end a third bracket connected to a second structural member in accordance with the teachings of the present invention.

FIG. 7 shows one embodiment of the present invention wherein connection assembly 16 includes a first connection bracket 31*c*, a second connection bracket 32*c* and a third connection bracket 33*c* each comprised of geometry similar to one of embodiment 10, 11, 12 and 13 disposed in a opposite directions in a series configuration with the first connection element 41*c* of the first bracket 31*c* connected to a first structural member 61*c*, the last connection element 51*c* of the first bracket 31*c* connected to the first connection element 42*c* of a second bracket 32*c*, the last connection element 52*c* of the second bracket 32*c* connected to the first connection element 43c of the third bracket 33c, and the last connection element 53c of the third bracket 33c connected to a second structural member 62b in accordance with the teachings of the present invention. Structural fasteners 64c are conceptually shown as dowel type fasteners though other types of structural fasteners could be used without departing from the scope of the present invention.

Figure 8:
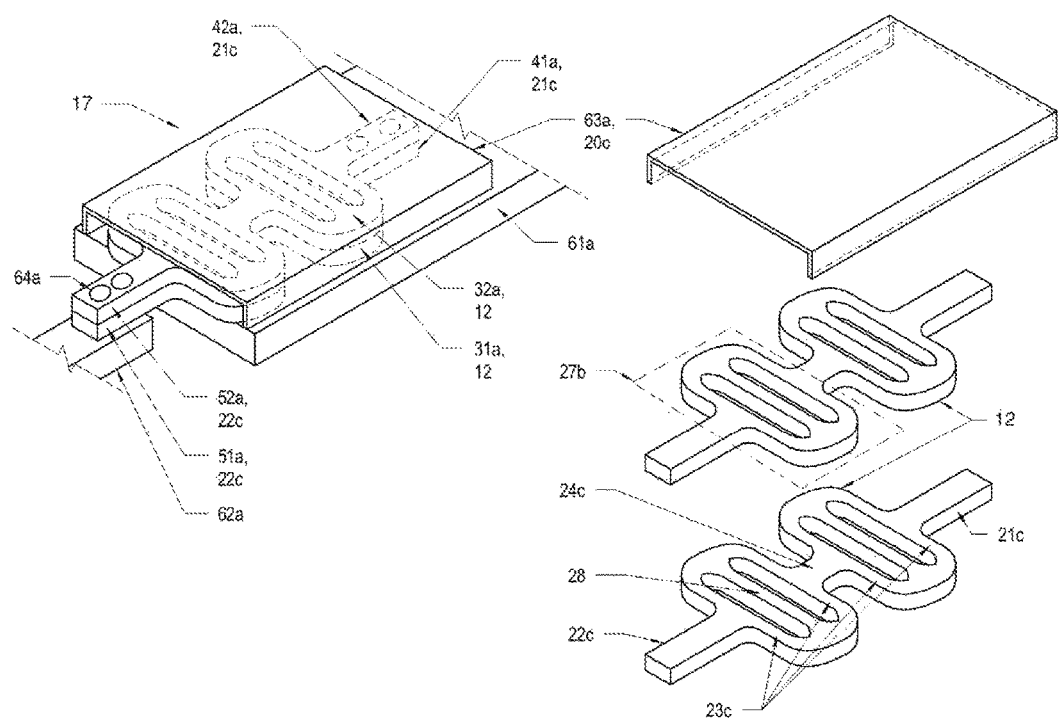
FIG. 8 is an isometric and dissected view of member-to-member connection assembly with two connection brackets of the embodiment described by FIG. 3 disposed in the configuration described by FIG. 5.

FIG. 8 shows one embodiment of the present invention wherein connection assembly 17 includes a first connection bracket 31a comprised of embodiment 12 and a second connection bracket 32a comprised of embodiment 12 each disposed in a parallel configuration with the first connection element 41a and 42a of bracket 31a and 32a respectively connected to a first structural member 61a and the last connection element 51a and 52a of each bracket 31a and 32a respectively connected to a second structural member 62a in accordance with the teachings of the present invention. Structural fasteners 64a are conceptually shown as dowels though other types of structural fasteners could be used without departing form the scope of the present invention. A U-shaped guide element 63a is shown on three sides of the laminar assembly of brackets 31a and 32a, and first structural member 61a is shown as a guide element on a forth side of the laminar assembly of brackets 31a and 32a though other configurations of guide elements could be used without departing from the scope of the present invention.

From the foregoing it will be seen that this invention is one well adapted to attain all ends and objects hereinabove set forth together with the other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

We claim:

1. A member-to-member connection assembly comprising:
    at least two planar connection brackets configured adjacently in a laminar configuration;
    each of said connection brackets comprised of a first connection member for coupling said connection bracket to a first structural member;
    each of said connection brackets comprised of a second connection member for coupling said connection bracket to a second structural member;
    each of said connection brackets comprised of at least two fuse configurations having similar material and geometry in one of a repeated S-shape, a plurality of circular or elliptical elements interconnected by a plurality of interconnection members, a rectangular shape with a stiffener element extending within the interior of the rectangular shape and between opposite sides of the rectangular shape, or a three-dimensional pattern in a spiral configuration;
    said at least two fuse configurations being disposed between said first connection member and said second connection member, said at least two fuse configurations being operable to deform upon application of a pre-determined loading condition, said at least two fuse configurations arranged in series such that an overall deformation between said first connection member and said second connection member during application of the pre-determined loading condition is the summation of the individual deformations of each fuse configuration during application of the pre-determined loading condition;
    each of said at least two fuse configurations comprise a geometry containing at least one fuse element being able to form at least one inelastic flexural hinge location to provide for inelastic deformation between said first connection member and said second connection member upon application of the pre-determined loading condition;
    said overall deformation between said first connection member and said second connection member is the change in linear distance between said first connection member and said second connection member.

2. The member-to-member connection assembly of claim 1 wherein said hinge location comprises a reduced thickness of the said fuse element.

3. The member-to-member connection assembly of claim 1 wherein said fuse elements are of geometry including straight, sloped, tapered, or curved.

4. The member-to-member connection assembly of claim 1 wherein said pre-determined load is less than the elastic yield load of said first structural member and said second structural member.

5. The member-to-member connection assembly of claim 1 wherein guide elements are disposed on multiple sides of the assembly to resist deformation nominally orthogonal to the direction of the applied load.

6. The member-to-member connection assembly of claim 5 wherein said guide elements are of geometry such as straight, sloped, skewed, stepped, or curved.

7. The member-to-member connection assembly of claim 5 wherein said guide elements are coupled to, or of unitary construction with, said first structural member or said second structural member.

8. The member-to-member connection assembly of claim 5 wherein said guide elements are coupled to, or of unitary construction with, one or more of said connection brackets.

9. The member-to-member connection assembly of claim 1 wherein said fuse elements partially or fully define a void, wherein said void is filled with a material that is one of elastomeric, fiber reinforced polymer, concrete, cementitious, and piezoelectric to provide increased elastic stiffness, inelastic stiffness, and/or damping.

10. The member-to-member connection assembly of claim 1 wherein said first structural member is one of a beam or a brace and said second structural member is one of a column or a gusset.

11. The member-to-member connection assembly of claim 1 wherein said first connection member of each of said connection brackets is coupled to said first structural member, and said second connection member of each of said connection brackets is coupled to said second structural member.

12. The member-to-member connection assembly of claim 1 wherein said first connection member of a first connection bracket is coupled to said first structural member;
    said second connection member of said first connection bracket is coupled to said first connection member of a second connection bracket;
    said second connection member of said second connection bracket is coupled to said second structural member.

13. The member-to-member connection assembly of claim 12 wherein said first connection bracket and said second connection bracket are disposed in opposite directions.

14. The member-to-member connection assembly of claim 1 wherein said first connection member of a first connection bracket is coupled to said first structural member;
   said second connection member of said first connection bracket is coupled to said first connection member of a second connection bracket;
   said second connection member of said second connection bracket is coupled to said first connection member of a last connection bracket;
   said second connection member of said last connection bracket is coupled to said second structural member.

15. The member-to-member connection assembly of claim 14 wherein said second connection bracket is repeated such that multiple connection brackets are disposed and connection in series between said first connection bracket and said last connection bracket.

16. The member-to-member connection assembly of claim 15 wherein one or more of said connection brackets are disposed in a direction opposite to an adjacent connection bracket.

17. The member-to-member connection assembly of claim 14 wherein one or more of said connection brackets are disposed in a direction opposite to an adjacent connection bracket.

* * * * *